United States Patent [19]

Tsuda et al.

[11] 4,395,115

[45] * Jul. 26, 1983

[54] CONVEYOR UNIT FOR BOOK CARRIER IN ELECTRO-PHOTOGRAPHIC COPYING MACHINES

[75] Inventors: Hiroshi Tsuda, Mitaka; Kiyoshi Miyashita, Hachioji; Akira Shimizu, Hachioji; Masaji Nishikawa, Hachioji; Muneo Kasuga, Hachioji, all of Japan

[73] Assignee: Olympus Optical Co. Ltd., Tokyo, Japan

[ * ] Notice: The portion of the term of this patent subsequent to May 26, 1998, has been disclaimed.

[21] Appl. No.: 178,169

[22] Filed: Aug. 14, 1980

[30] Foreign Application Priority Data

Sep. 27, 1979 [JP] Japan ................................ 54-124886

[51] Int. Cl.³ ............................................. G03B 27/62

[52] U.S. Cl. ........................................ 355/25; 355/51; 355/75

[58] Field of Search ................... 355/8, 25, 75, 76, 50, 355/51, 11, 35 H

[56] References Cited

U.S. PATENT DOCUMENTS

| | | | |
|---|---|---|---|
| 3,597,074 | 8/1971 | Murgas et al. | 355/25 |
| 3,659,937 | 5/1972 | Yamanoi | 355/3 |
| 3,695,754 | 10/1972 | Washio et al. | 355/3 |
| 3,737,223 | 6/1973 | Yamamoto | 355/25 X |
| 4,243,312 | 1/1981 | Ogawa | 355/8 |
| 4,269,502 | 5/1981 | Tsuda et al. | 355/51 X |

*Primary Examiner*—G. Z. Rubinson
*Assistant Examiner*—W. J. Brady
*Attorney, Agent, or Firm*—Weinstein & Sutton

[57] ABSTRACT

A conveyor unit for a book carrier includes a book carrier on which an original having substantial thickness such as a book is placed, and conveys it to an exposure station in order to form an electrostatic latent image of the original in a copying machine. A driven member in the form of a rack is formed on the book carrier, and is driven by a drive member in the form of a pinion which is provided on the part of the copying machine. Elements are provided to maintain such drive relationship. In this manner, a book carrier is positively and reliably conveyed.

14 Claims, 5 Drawing Figures

CONVEYOR UNIT FOR BOOK CARRIER IN ELECTRO-PHOTOGRAPHIC COPYING MACHINES

BACKGROUND OF THE INVENTION

The invention relates to a conveyor unit for a book carrier in electrophotographic copying machines, and more particularly, to such conveyor unit used in an electrophotographic copying machine of the type in which an original to be copied is fed through an exposure station for the purpose of copying and in which the conveyor unit operates to convey a book carrier carrying an original having a substantial thickness such as a book thereon through an exposure station of the copying machine.

As is well recognized, a conventional electrophotographic copying machine of the type in which an original is fed through an exposure station for copying purpose is constructed as illustrated in FIG. 1, for example. The machine is provided with an original feed path which is normally conditioned to enable the copying of a single sheet-shaped original, as shown. In the condition shown, a sheet-shaped original 1 is placed on an inclined original receptacle 2, and is inserted into the inlet of an original conveyor unit which includes pairs of conveyor rollers 4A, 4B and 5A, 5B and a pair of guide plates 6, 7. After passing through the inlet, the original 1 is fed into the nip between the pair of vertically spaced conveyor rollers 4A, 4B to be fed toward and through an exposure station 8 while passing between the guide plates 6, 7 and between the guide plate 6 and the exposure station 8. After passing through the exposure station 8, the original 1 is fed into the nip between the other pair of vertically spaced conveyor rollers 5A, 5B to be delivered onto an original tray 9.

As the original 1 is fed by the original conveyor unit, a pair of microswitches 3A, 3B, located adjacent to the rollers 4A, 4B, detect the position of the original 1, and the timing of operation of the various parts of the electrophotographic copying machine is controlled based upon this detection. As the original 1 passes through the exposure station 8, an illumination lamp 10 illuminates the surface of the original, whereupon an exposure optical system 11 projects an image of the original 1 onto a photosensitive drum 12. The drum 12 rotates in a direction indicated by an arrow B. Any electric charge is initially removed from the drum surface by means of a neutralizer lamp 13, and then the drum surface is uniformly charged by means of a corona charger 14. Then the drum surface is irradiated with the light image of the original to have an electrostatic latent image of the original 1 formed thereon. The latent image is developed by a developing unit 15 of dry type to form a toner image, which is moved to a transfer station 16 as the drum 12 rotates.

On the other hand, a record sheet 18 is fed one by one from its stack contained in a cassette 17 by means of a rocking and rotating feed roller 19, and is fed to the transfer station 16 by a pair of vertically spaced feed rollers 20 in timed relationship with the rotation of the drum so that the record sheet is superimposed on the toner image on the drum surface. Thereafter, the record sheet is conveyed between the drum 12 and a transfer roller 21 to which a bias voltage is applied. Such process transfers the toner image onto the record sheet. Since the record sheet is conveyed in tight contact against the drum surface during the process, the sheet must be separated from the drum surface by utilizing a separation claw 22 which cooperates with an airstream, as will be described later. After the transfer step, the record sheet is conveyed along a guide plate 23 to be fed, by a pair of vertically spaced feed rollers 24, into a fixing unit 25 which includes a heater where the toner image is fused and fixed to the record sheet. Subsequently, the sheet is delivered onto a copy tray 27 by means of a pair of vertically spaced delivery rollers 26.

Any residue of toner which remains on the drum surface after the transfer step is removed by a rotating cleaning brush 28, from which toner is withdrawn by an airstream created by a fan 29 so as to be collected in a filter 30. Both the cleaning brush 28 and the fan 29 are covered by a casing 31 in order to produce an effective withdrawal effect upon the toner residue and to prevent a dispersion of the toner into the apparatus. An airstream displaced by the fan 29 is introduced into a duct 32 having its outlet port 32*a* located adjacent to the transfer station 16, so that the airstream is effective to separate the record sheet from the drum 12 by cooperation with the separation claw 22.

The disclosed copying machine is designed so that an electrostatic latent image once formed on the drum surface may repeatedly be used to provide a plurality of copies in succession through a repeated process of developing with a toner and image transfer. In this instance, the cleaning brush 28, which is mounted on a holding member 34 rotatably mounted on a support shaft 33, is moved away from the drum 12 and the neutralizing lamp 13 and the charger 14 are maintained inoperative.

Such copying machine is normally used to provide a copy or copies from a single sheet-shaped original, but can be operated to provide a copy from an original having an increased thickness such as a book in a manner to be mentioned below. Specifically, a frame 35 which is adapted to define an extension of a conveying path and carrying the upper conveyor rollers 4B, 5B, which are constructed as follower rollers, and also carrying the guide plate 6 is pivotally mounted on a pin 36 so as to be turned through 180° in a direction indicated by an arrow C. When so turned, the rollers 4B, 5B and the guide plate 6 define as extension of the conveying path which is contiguous with the exposure station 8 and which is located above the original tray 9 (see FIG. 2).

A book carrier for placing a thick original can now be used. A book carrier having a thick original placed thereon is initially placed on the original receptacle 2, and is conveyed toward the exposure station 8 by means of conveyor rollers 4A, 5A, which act as drive rollers during a copying operation and which cooperate with their associated drive members. As the book carrier passes through the exposure station, the original is irradiated through a transparent plate on which it is placed, whereby a copying operation takes place.

In the prior art practice, the book carrier has been conveyed by disposing the bottom surface of the book carrier in contact with the drive rollers 4A, 5A. Since the drive depends on the force of friction acting between the bottom surface of the book carrier and drive rollers 4A, 5A, the arrangement essentially fails to provide a stabilized speed, thus disadvantageously causing "step out" in the copied image.

To overcome this difficulty, in practice, a user had to place his hand on the book carrier to press it down while it is being conveyed until it bears against the first drive rollers 4A. The hand must be continued to be placed against the book carrier to maintain the abutment of the book carrier against the drive rollers 4A and the following drive rollers 5A.

Such use of the book carrier is troublesome or tedious and requires a certain degree of skill, since if the book carrier is strongly pressed down, the pressure applied may exceed the force of friction to cause the drive rollers to slip, thus ceasing a drive transmitted to the book carrier. Alternatively, the pressure applied may cause a flexure in the transparent plate of a reduced thickness on which the book carrier is placed, causing it to move into contact with guide members of the copying machine rather than the drive rollers 5A, 5B, thus causing a damage which disadvantageously results in a degradation in the copied image, for example, a whitening of a black image area or letters becoming thin.

There is also known a conveyor unit in which follower rollers are disposed so that their opposite lateral edges are in opposing relationship with the lateral edges of drive rollers to hold a book carrier formed by a transparent plate therebetween as the book carrier is being conveyed. In this construction, the conveying operation of the book carrier is initiated when the book carrier is inserted into the nip between the initial drive roller and its associated follower roller. However, the book carrier must be pushed into the nip against the pressure exerted by the follower roller before the book carrier can be conveyed since it must be held between the cooperating rollers under the pressure exerted by the follower roller. Hence, the initial insertion of the book carrier into the nip between the rollers is difficult, requiring a degree of skill for a proper operation.

In this record arrangement, again the conveying operation of the book carrier takes place as a result of the force of reaction acting between it and the drive and follower rollers, inevitably causing an unstable conveying speed and the likelihood to cause the aforementioned "step out" condition. In addition, when the book carrier is being conveyed by being held between the drive and follower rollers under pressure, the book carrier or the transparent plate may still move into abutment against guide plates to be damaged or flexed to cause an upward shift at the exposure station, preventing proper focussing within the optical system from being achieved.

To stabilize or assure a positive insertion of the book carrier into the nip between the rollers, the positional relationship between, the outer diameters, the material and hardness of the drive and follower rollers must be closely controlled, presenting a serious quality maintenance problem and an increased cost.

SUMMARY OF THE INVENTION

It is an object of the invention to eliminate the abovementioned disadvantages, by providing a conveyor unit for a book carrier which includes forced conveying means and book carrier retainer means so that the book carrier can be maintained in positive engagement with the body of a copying machine during the time it is being conveyed.

In accordance with the invention, the book carrier is formed with a rack, which is brought into meshing engagement with a drive pinion to initiate the conveying operation of the book carrier whenever the leading end of the book carrier is inserted into the clearance region between a retainer plate and the drive pinion. No undue forces are required to insert the book carrier, and the conveying operation is smoothly and positively initiated. The retainer plate is disposed to provide suitable clearance from the book carrier along the conveying path thereof, so that it is effective to control the direction in which it is being conveyed. In this manner, the rack and the pinion can be maintained in meshing engagement without requiring any means for manually biasing the book carrier toward the pinion. Since the book carrier is reliably conveyed while it is located over the pinion and conveyor rollers, the transparent plate of the book carrier is spaced from its opposite guide plates with a small clearance, preventing any damage caused thereto.

DESCRIPTION OF PREFERRED EMBODIMENTS

Figure 1:
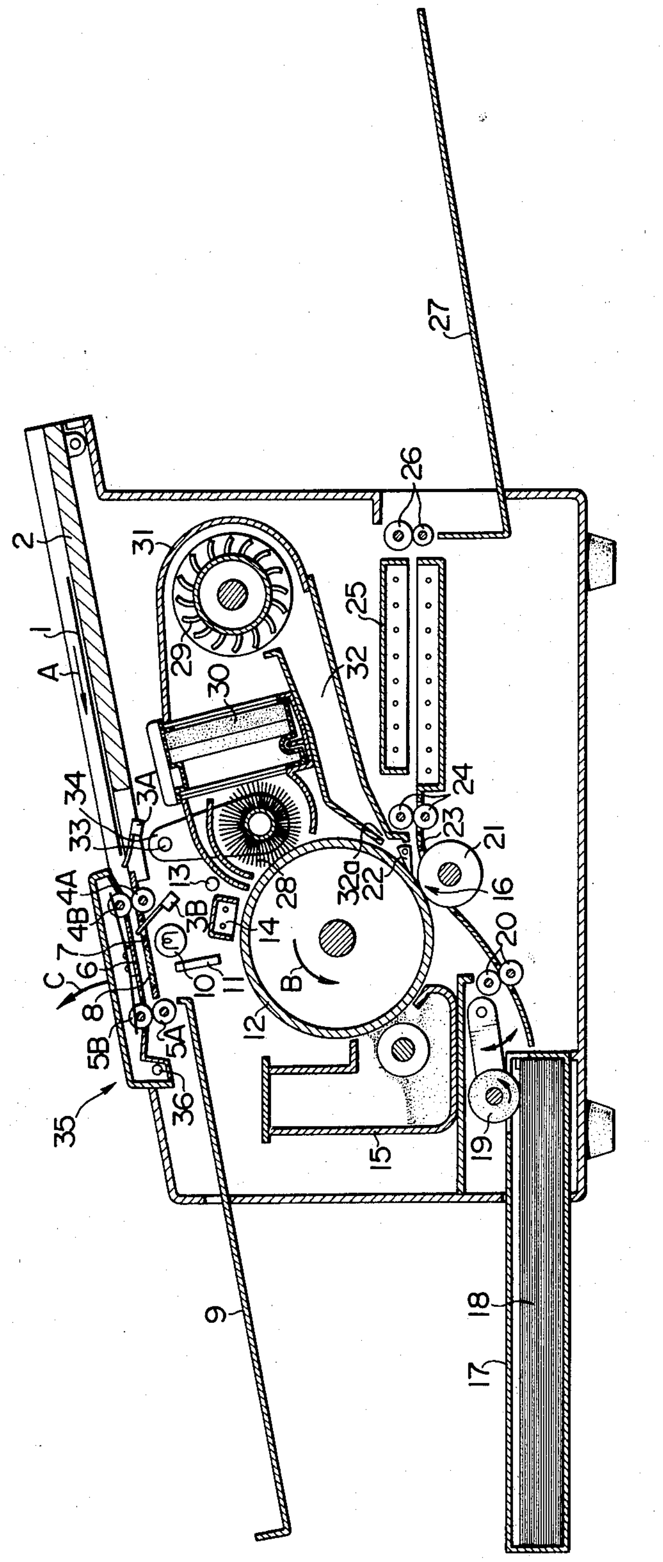
FIG. 1 is a schematic cross section of one form of an electrophotographic copying machine in which a book carrier may be used.
Figure 2:
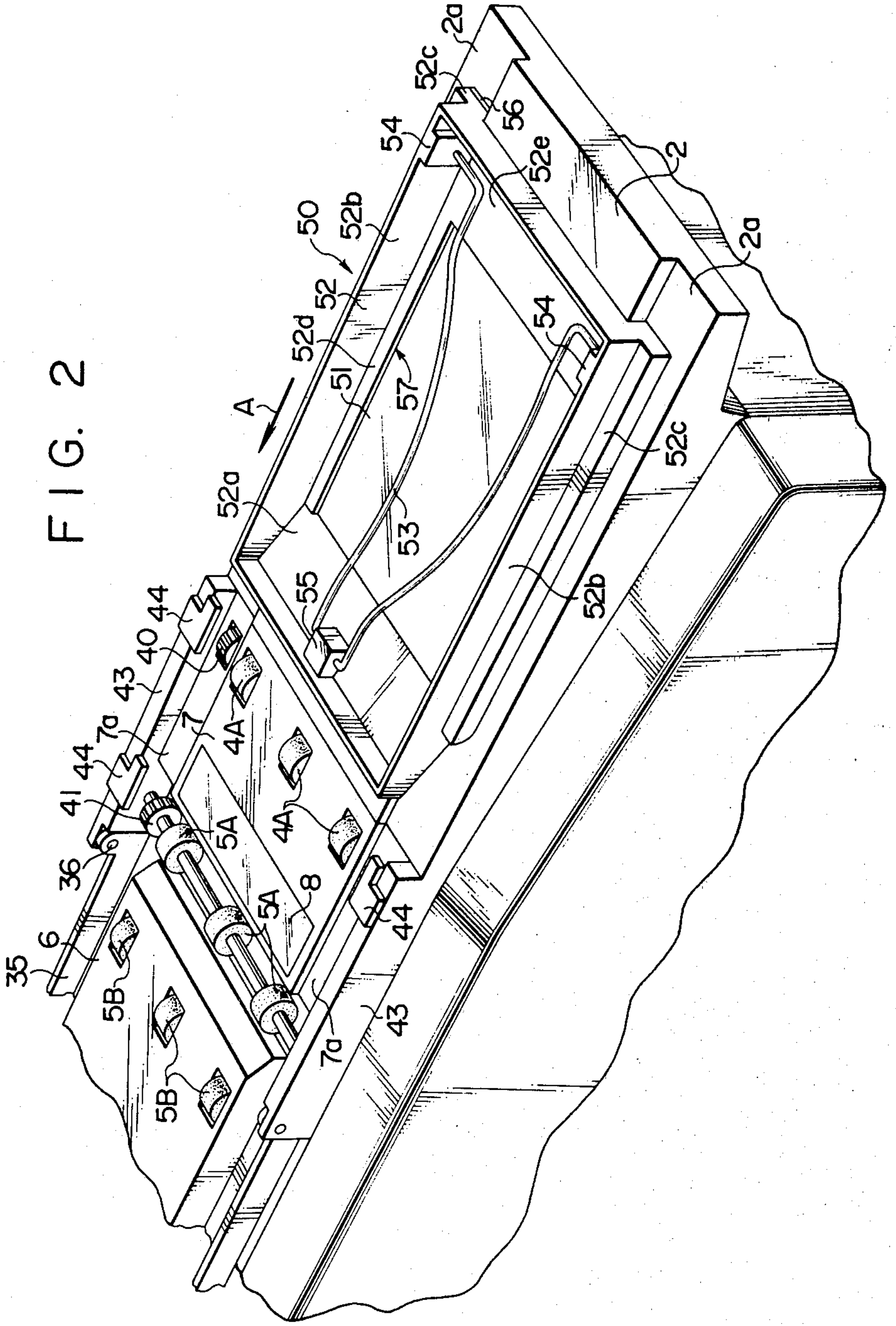
FIG. 2 is a perspective view of a conveyor unit for a book carrier according to one embodiment of the invention.

Referring to FIG. 2, there is shown a conveyor unit for a book carrier according to one embodiment of the invention in perspective view. The conveyor unit comprises a book carrier 50 including a rectangular transparent plate 51 of a relatively flexible material such as thin plastics on which a book or the like may be disposed with the surface of original to be copied placed downwardly and in abutment against the transparent plate 51. The unit also comprises a rectangular, tray-shaped support 52 having a bottom surface in the form of a picture frame on which the transparent plate 51 is centrally disposed in a detachable manner. The support 52 is lengthwise driven from a location on the original receptacle 2 toward the exposure station 8, by a drive member to be described later, during a copying operation. A substantially V-shaped book retainer 53 formed by resilient wire is disposed lengthwise in the central portion of the support 52, and has its opposite ends releasably mounted in a pair of detent holes formed in tabs 54 which are integral with both side-plates **52*b* of the support 52. The apex portion of the V-shaped book retainer 53 is rotatably received in a holder 55 which is integrally formed on the support 52. In this manner, a book can be held between the wire and the transparent plate 51 in a condition such that the book lies against an inclined front bottomplate 52*a* of the support 52, which represents the front end of book carrier 50. When the book carrier 50 is used, the frame 35 is turned 180° in the direction of the arrow C (see FIG. 1) about the pin 36 to locate the conveyor rollers 4A, 5A, 4B, 5B, the guide plates 6, 7 and the exposure station 8 all exposed as mentioned previously. The guide plate 7 and the original receptacle 2 are formed with guide grooves 7*a*, 2*a* of a lower elevation than their associated central surfaces in order to facilitate guiding the book carrier 50. Disposed in one of the guide grooves 7***a* are a pinion 40 which represents a drive member for the book carrier and which is mounted on the same drive shaft as the conveyor rollers 4A, and another pinion 41, also representing another drive member, which is mounted on the same drive shaft as the conveyor rollers 5A. The pinions 40, 41 act to operate a driven member mounted on the book carrier 50, to be described later. The pinions 40, 41 have a pitch circle of a diameter which is the same as the outer diameter of the conveyor rollers 4A, 5A. A pair of retainer plates 44 are secured to the upper surface of each of the side plates 43, located outside the guide grooves 7, so as to extend horizontally over the respective guide grooves 7*a* so that they constrain the book carrier 50 from shifting upward as the latter reaches the location of these retainer plates.

The retainer plates 44 are located at an elevation such that when a rack 56 on the book carrier 50, which represents the driven member, meshes with the pinions 40, 41, a certain clearance $g_A$ (see FIG. 3) is left between the retainer plates 44 and the book carrier 50.

To permit a movement of the book carrier 50 while avoiding a contact of its central lower surface with the original receptacle 2 when it is placed on the receptacle 2, both side plates 52*b* of the support 52 have respective lower extensions which bear against the bottom surface of the guide grooves 2*a* formed on the opposite sides of the original receptacle 2. A pair of horizontal ledges 52*c* (see FIG. 3) are integrally formed with the lower end of both sideplates 52*b*, and one of the ledges which is aligned with the pinions 40, 41 when the book carrier 50 is placed on the original receptacle 2 with the front bottom plate 52*a* facing the exposure station 8, is formed with the rack 56 (see FIG. 3) in its lower surface. The rack 56 represents the driven member which meshes with the pinions 40, 41 to feed the book carrier, and is arranged to avoid its abutment against the bottom surface of the guide grooves 2*a* formed in the original receptacle 2.

A pair of ledges 52*d* are formed on the inside of both sideplates 52*b* of the book carrier 50, and notched grooves 57 (see FIG. 3) are formed therein so as to extend horizontally. The lateral edges of the transparent plate 51 are fitted into the grooves 57, whereby plate 51 is secured to the support 52. The transparent plate 51 which defines the central bottom surface of the book carrier 50 has an elevation to avoid a contact of its lower surface with the original receptacle 2 when the book carrier 50 is placed on receptacle 2.

The book carrier 50 thus constructed is placed on the original receptacle 2 of the copying machine with its front end located nearer the exposure station 8 as illustrated in FIG. 2, and during a copying operation, the carrier 50 is free to slide in the direction of the arrow A toward the exposure station 8 until the leading end of each of the ledges 52*c* of the book carrier 50 is located directly below the retainer plates 44, whereupon the front end of the rack 56 is brought into meshing engagement with the pinion 40 to drive the book carrier 50 in the direction of the arrow A. During the movement of the book carrier 50, as the transparent plate 51 reaches the exposure station 8, the surface of the original, such as a book which is placed thereon, is irradiated or illuminated through the transparent plate 51. Subsequently, the rack 56 on the book carrier 50 moves into meshing engagement with the pinion 41, and after the entire surface of the original on the transparent plate 51 has passed through the exposure station 8, the book carrier 50 passes through the nip between the conveyor rollers 4B, 5B, which now assume the inverted position of the frame 35, until its leading end bears against an adjacent end of the original tray 9, whereupon it ceases to move, with a rear bottom plate 52*e* of the support 52 located above the exposure station 8. In this manner, the projection of an image of the original through the exposure station 8 is blocked by the rear bottom plate 52*e*.

Figure 3:
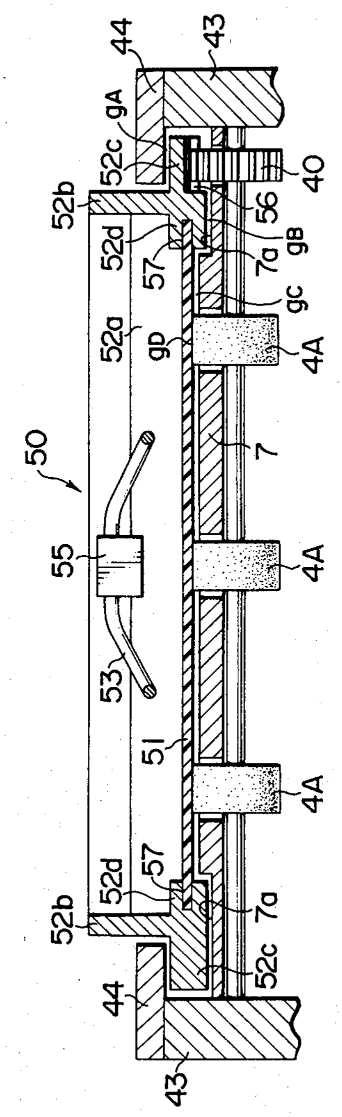
FIG. 3 is an enlarged cross section of the conveyor unit shown in FIG. 2.
Figure 4:
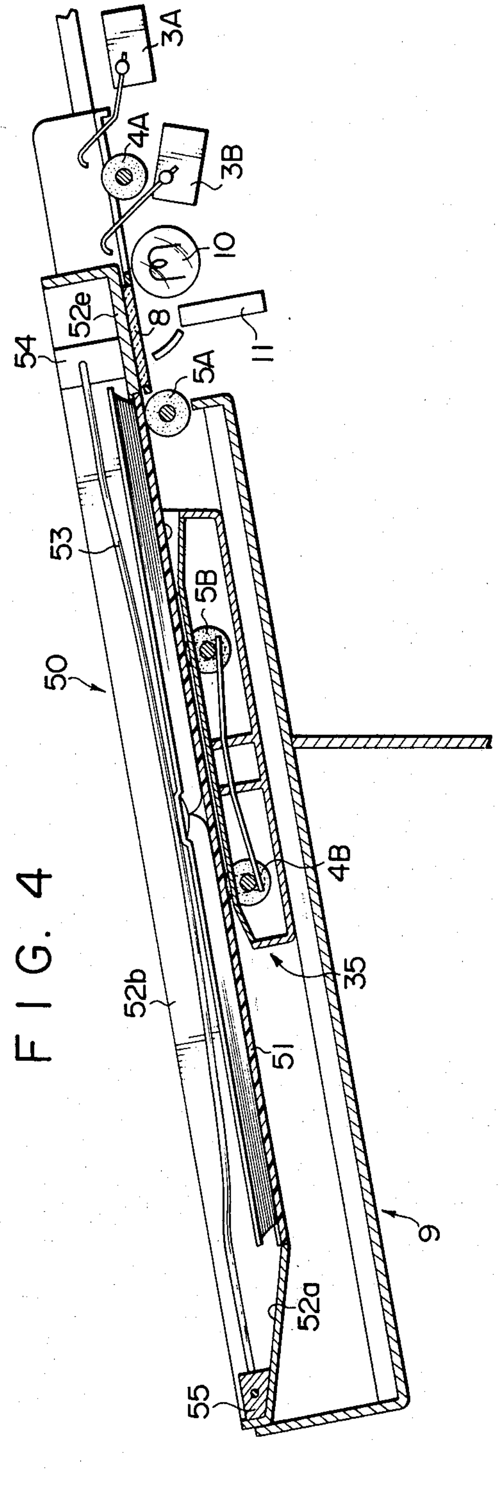
FIG. 4 is an enlarged section of the conveyor unit shown in FIG. 2 and transverse to the cross-section of FIG. 3.

It will be noted that during the time the book carrier 50 is being conveyed in the direction of the arrow A, when the rack 56 meshes with the pinion 40 (41) as shown in FIG. 3, the weight of an original such as a book which is placed on the book carrier 50 may cause the lower surface of the transparent plate 51 to be depressed into abutment against the conveyor rollers 4A (5A). Accordingly, the book carrier 50 will also be driven by such roller 4A (5A), but it should be understood that a positive movement of the book carrier 50 in the direction of the arrow A is achieved principally by the drive which is provided by the meshing engagement between the rack 56 and the pinion 40 (41).

It will also be noted that during the movement of the book carrier 50, the lower surface of both sideplates 52*b* of the book carrier 50 will be slightly shifted above the surface of the guide grooves 7*a* when passing thereover since the pinions 40, 41 mesh with the rack 56 and the transparent plate 51, even though the clearance $g_B$ formed therebetween is very small.

The ledges 52*c* of the book carrier 50 move below the retainer plates 44 which extend over the guide grooves 7*a* as the rack 56 advances forward by meshing engagement with the pinions 40, 41. However, a clearance $g_A$ is formed between the upper surface of the ledges 52*c* and these retainer plates 44 which is sufficient to permit a smooth conveying operation of the carrier 50. The clearance is also effective to accommodate for certain variations in the size or location of the rack 56 and the drive pinions 40, 41 or a flexure in the book carrier 50. In the present embodiment, the clearance $g_A$ has a length of about 0.4 mm, for example, which is substantially equal to the module of the drive pinions 40, 41, thus preventing a disengagement of the rack 56 from the pinions 40, 41.

When the book carrier 50 is conveyed in the direction of the arrow A by means of forced conveying means, comprising the rack 56 and the drive pinions 40, 41, while its movement is properly constrained by the retainer plates 44, the lower surface of the transparent plate 51 will almost contact conveyor rollers 4A which slightly project above the upper surface of the guide plate 7. Thus, a clearance therebetween $g_D \approx 0$. Consequently, a certain clearance $g_C$ is maintained between the lower surface of the transparent plate 51 and the upper surface of the guide plate 7. It is to be noted that the magnitude of the clearance $g_C$ is greater than that of the clearance $g_B$ formed between the lower surface of the sideplates 52*b* and the upper surface of the guide grooves 7*a*.

Summarizing, the conveyor unit for book carrier according to the invention comprises positive conveying means which comprises the drive pinions 40, 41 and the rack 56, and the retainer plates 44 which maintain a suitable clearance $g_A$ as the book carrier 50 is conveyed by the conveying means. Hence, when a book carrier is to be conveyed, it is only necessary that the front end of the ledge 52*c* of the carrier 50 be slipped into the clearance space between the rotating pinion 40 and the retainer plates 44, whereupon a positive conveying operation is initiated. Since the retainer plates 44 constrain the direction of the movement during the conveying operation so that the rack 56 cannot be disengaged from the drive pinions 40, 41, a smooth and reliable conveying operation is achieved in a forced manner without requiring any manual intervention to hold the book carrier 50. Experiments have revealed that no "step out" occurs and that the absence of any pressure applied to the book carrier 50 produces minimal damage to the transparent plate 51.

While in the embodiment described above, the pair of retainer plates 44 are provided on the opposite sides of the copying machine, it should be understood that only one of them may be used on that side on which the drive pinions 40, 41 are provided. In addition, an increased number of retainer plates 44 may be used. For example, a continuous single plate may be used, if desired.

Figure 5:
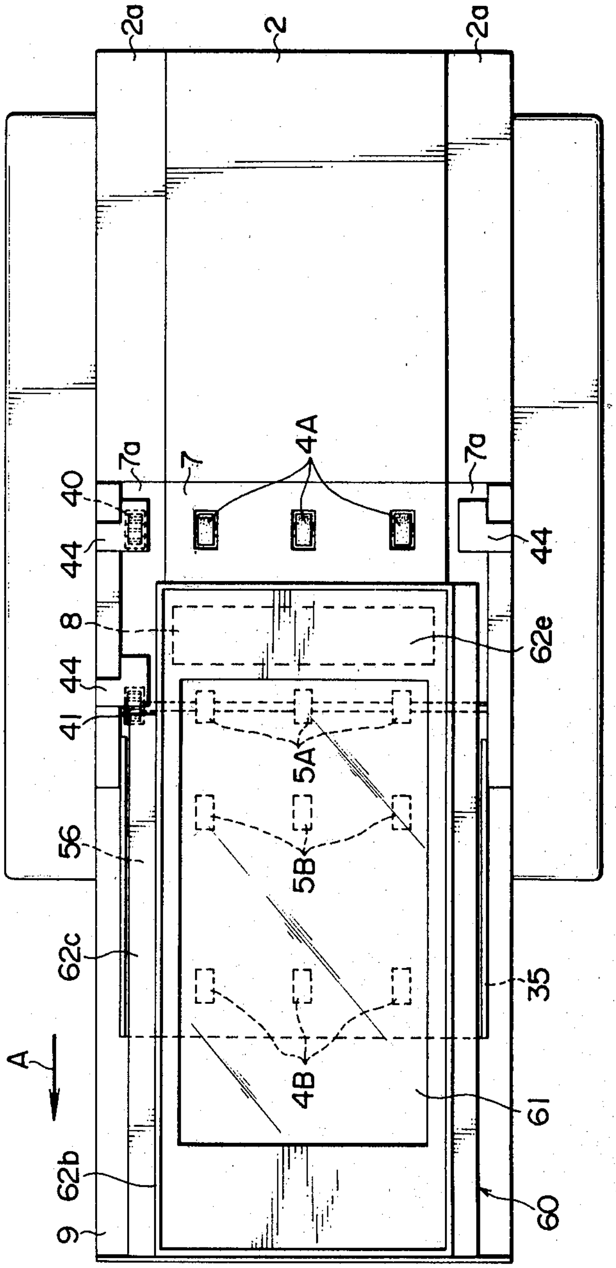
FIG. 5 is a plan view of a conveyor unit for book carrier according to another embodiment of the invention.

FIG. 5 is a plan view of a conveying unit for book carrier according to another embodiment of the invention. While in the previous embodiment, the copying machine is capable of providing a plurality of copies in succession, it is then necessary that the exposure station 8 be covered by the rear bottom plate of the book carrier 50 as mentioned previously in order to prevent any incidence of extraneous light into the exposure optical system 11 after each copying operation. However, it is desirable that the book carrier can be easily removed under this condition. To this end, in the embodiment of FIG. 5, a book carrier 60 includes a rack 56 and a ledge **62*c* extending from one of the sideplates 62*b* on which the rack 56 is provided, both of which are notched for a given length at their rear end. Accordingly, as the book carrier 60 is conveyed in the direction of the arrow A and the entire surface of a transparent plate 61 has passed through the exposure station 8 to have its leading end located in abutment against the adjacent end of the original tray 9, the rear bottom plate 62*e* of the book carrier 60 is positioned to cover the exposure station 8, and the rear end portion of the flange 62*c* clears the retainer plate 44, thereby allowing the book carrier 60** to be raised directly upward out of the conveying path.

It should be understood that rather than constituting the positive conveying means with the drive pinions 40, 41 provided on the copying machine and the rack 56 on the book carrier 50, 60, it may comprise a driving ratchet wheel provided on the copying machine for cooperation with perforations formed in the carrier which engage the ratchet wheel. Various other arrangements can be easily implemented.

What is claimed is:

1. A conveyor unit in an electrophotographic copying machine for selectively conveying either a thin original or an original having substantial thickness, such as a book, to an exposure station to form an electrostatic latent image of said original for a copying purpose, comprising:

a book carrier including a frame having a transparent central portion on which said original having substantial thickness is placed to be conveyed to said exposure station;

a driven member formed on said book carrier for conveying it;

first and second commonly driven drive members on said unit respectively engageable with said thin original and said driven member for respectively driving said thin original and said carrier; and a rigid, stationary carrier retainer plate on said unit for maintaining a slight clearance with respect to the upper surface of the frame of said book carrier to constrain said book carrier from shifting upward as said drive member cooperates with said driven member while providing sufficient clearance to facilitate simple and rapid insertion and/or removal of the book carrier from the conveyor unit.

2. A conveyor unit according to claim 1 in which said driven member comprises a rack integrally formed on said book carrier.

3. A conveyor unit according to claim 2 in which the frame of said book carrier includes a ledge which projects horizontally outward from the lower end thereof, said rack being integrally formed on the lower surface of said ledge.

4. A conveyor unit according to claim 3 in which a portion of said rack and said ledge are notched in a region which is located opposite to said carrier retainer plate to facilitate rapid removal of the book carrier by upward lifting thereof when said book carrier has been conveyed to the end of its travel.

5. A conveyor unit according to claim 2 in which said drive member comprises a pinion which meshes with said rack to drive the book carrier.

6. A conveyor unit according to claim 5 in which said pinion is mounted on a drive shaft which is associated with said first drive member, said first drive member comprising a conveyor roller provided on said copying machine for the purpose of conveying a thin original, said pinion having a pitch circle of a diameter which is the same as the diameter of said conveying roller.

7. A conveyor unit according to claim 1 in which said carrier retainer plate is secured to said copying machine, with a portion thereof extending to a position at least directly opposite the location where said driven member of said carrier and said drive member on said copying machine cooperate with each other.

8. A conveyor unit according to claim 1 in which first and second carrier retainer plates are provided and are disposed at least along the opposite lateral edges of a path of movement of said carrier.

9. The conveyor unit of claim 8 wherein said book carrier frame is provided with elongated outwardly extending lateral ledges each movable beneath one of said retainer plates as said book carrier moves over said exposure station.

10. The conveyor unit of claim 9 further comprising a swingable frame swingable between a first position above said exposure station for conveying thin originals, and a second position forming an extension of the conveying path of said book carrier.

11. The conveyor unit according to claim 10 wherein said swingable frame further includes a follower roller cooperating with said first drive member to move thin originals through the exposure station when the swingable frame is in said first position.

12. The conveyor unit according to claim 1 in which the driven member is a rack, the second drive member is a pinion and the aforementioned slight clearance distance is substantially equal to the module of said pinion.

13. The conveyor unit according to claim 1 wherein the frame of said book carrier has a portion thereof which is opaque and which is arranged to substantially completely cover said exposure station when the entire surface of the transparent portion of said book carrier has passed through the exposure station.

14. The conveyor unit according to claim 1 comprising means adjacent to said conveyor unit for supporting and slidably receiving said book carrier and including means engaging said book carrier to assure proper alignment of said book carrier with said conveyor unit as said book carrier is pushed along said slidable receiving means toward said conveyor unit.

* * * * *

UNITED STATES PATENT AND TRADEMARK OFFICE

CERTIFICATE OF CORRECTION

PATENT NO. : 4,395,115

DATED : July 26, 1983

INVENTOR(S) : Hiroshi Tsuda, et al

It is certified that error appears in the above—identified patent and that said Letters Patent is hereby corrected as shown below:

Column 5, line 13, change "7" to --7a--.

Signed and Sealed this

*Eighteenth* Day of *October 1983*

[SEAL]

*Attest:*

GERALD J. MOSSINGHOFF

*Attesting Officer* — *Commissioner of Patents and Trademarks*